United States Patent [19]

Beard et al.

[11] Patent Number: 4,854,408

[45] Date of Patent: Aug. 8, 1989

[54] OBSTACLE SURMOUNTING AID FOR TRACKED VEHICLE

[75] Inventors: David R. Beard; Peter J. Gibson; Christopher B. Hinchey, all of Surrey, England

[73] Assignee: The Secretary of State for Defence in her Majesty's Government of the United Kingdom of Great Britian and Northern Ireland, London, England

[21] Appl. No.: 91,066

[22] PCT Filed: Oct. 27, 1986

[86] PCT No.: PCT/GB86/00664

§ 371 Date: Aug. 7, 1987

§ 102(e) Date: Aug. 7, 1987

[87] PCT Pub. No.: WO87/02634

PCT Pub. Date: May 7, 1987

[30] Foreign Application Priority Data

Oct. 29, 1985 [GB] United Kingdom ............. 8526602

[51] Int. Cl.⁴ ............................................. B62D 55/06
[52] U.S. Cl. ................................................ 180/9.32
[58] Field of Search .................. 180/9.32, 8.1, 8.4; 280/5.3

[56] References Cited

U.S. PATENT DOCUMENTS

| | | | |
|---|---|---|---|
| 1,298,703 | 4/1919 | Havens | 180/8.4 |
| 2,012,090 | 8/1935 | Straussler | 180/9.32 X |
| 2,878,882 | 3/1959 | Bernotas | 180/8.4 |
| 3,417,831 | 12/1968 | Lake | 180/8.2 |
| 4,401,178 | 8/1983 | Studer | 180/8.2 |

FOREIGN PATENT DOCUMENTS

| | | | |
|---|---|---|---|
| 675507 | 5/1939 | Fed. Rep. of Germany | 180/9.32 |
| 1076108 | 7/1967 | United Kingdom | 180/9.32 |

Primary Examiner—John A. Pekar
Attorney, Agent, or Firm—William R. Hinds

[57] ABSTRACT

A tracked vehicle with a rearwardly extending ram (13) and an energizing means (14) for the ram, for assisting the vehicle in mounting precipitous objects. A preferred vehicle configuration uses only three, track direction changing rollers (6, 7, 8) so as to locate the center of gravity (16) of the vehicle as far forward as possible.

8 Claims, 1 Drawing Sheet

OBSTACLE SURMOUNTING AID FOR TRACKED VEHICLE

TECHNICAL FIELD OF THE INVENTION

This invention relates to a tracked vehicle, in particular but not exclusively, suitable for unmanned deployment in hostile environments.

BACKGROUND ART

The mobility of an unmanned vehicle is extremely dependent upon the terrain, obstacles in the path of the vehicle causing various mobility failures such as overturning, gross slippage, nose-in failure and hang-up failure, the latter two being caused by engagement of the nose and belly respectively of the vehicle with the terrain.

In particular, nose-in failure will inevitably occur when an obstacle to be surmounted rises precipitously to a height comparable with or greater than the length of the track base of the vehicle.

The present invention seeks to provide a vehicle less susceptible to nose-in failure at precipitous obstacles.

FEATURES AND ASPECTS OF THE INVENTION

According to the present invention a tracked vehicle comprises two independently drivable parallel tracks each having a track base, a chassis supported on the parallel tracks; an obstacle surmounting aid comprised by at least one rearwardly extendable ram slidable in a cylinder mounted above the chassis and a pneumatic energising means for thrusting the ram rearwards of the cylinder when the vehicle is in motion.

The cylinder is preferably inclined to the track base in a direction providing convergence at a point rearward of the vehicle of a line projecting longitudinally through the cylinder with a line projected longitudinally along the track base. The said inclination is preferably in the range 0 degrees to 60 degrees.

In order to minimize hang-up failure the tracks preferably together extend substantially the full width of the chassis so as to cover fully the underside thereof, and the chassis is located entirely within the periphery of the tracks and carries a top hamper upon which the cylinder is mounted and which bridges the tracks. The top hamper also conveniently supports a control means for controlling the vehicle drive mechanisms and the ram energising means. The energising means for the rams may be mounted either upon the top hamper or within the body.

Preferably two rams are mounted in parallel arrangement to provide lateral stability in use which rams may be either rigidly interconnected by a crossbar attached to their projectable ends or may be independently controlled.

Where the vehicle is intended for unmanned use the chassis and track drive mechanisms mounted thereon are contained entirely within the perimeter of the tracks. Access to the drive mechanisms may be achieved by a drawer system, i.e., the various components being slidably mounted on runners transverse to the longitudinal center line of the vehicle.

DESCRIPTION OF PREFERRED EMBODIMENT

Figure 1:
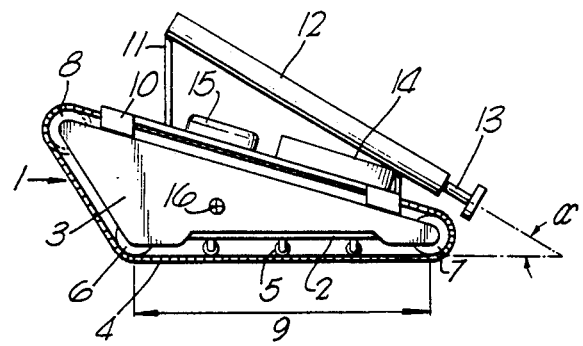
Figure 2:
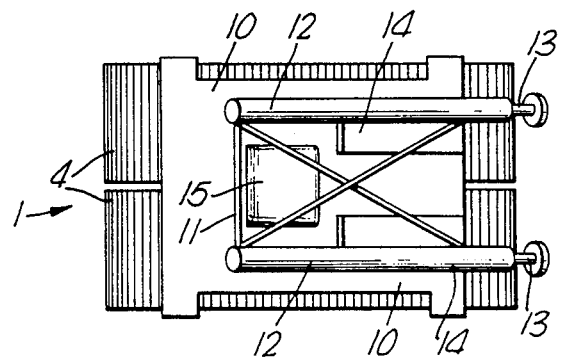
Figure 3:
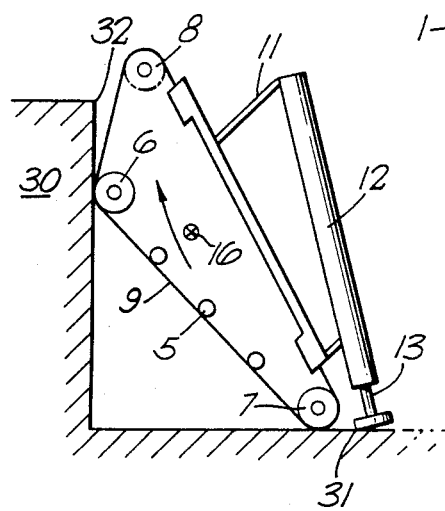
Figure 4:
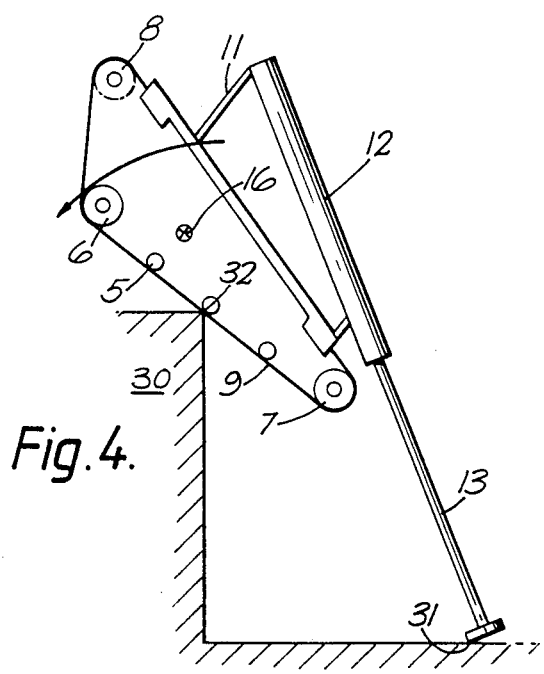

A specific embodiment of the invention will now be described by way of example only, with reference to the attached drawings of which FIGS. 1 and 2 are side elevation and plan views respectively of a tracked vehicle fitted with an obstacle surmounting aid, and FIGS. 3 and 4 depict the same vehicle respectively encountering and surmounting a precipitous obstacle.

The tracked vehicle 1 illustrated in FIG. 1 is intended for unmanned use and comprises a chassis 2 covered by a body 3 and supported on each of two independently drivable, half-width tracks 4 by support wheels 5. Each track 4 rotates about three direction changing rollers 6, 7 and 8, the two lower rollers, ie road rollers 6 and 7 defining a track base 9 and the upper roller 8 comprising a drive sprocket roller disposed forwardly of the track base 9. Drive mechanisms (not shown) for the drive sprocket roller 8 are contained within the body 3.

The body 3 supports a top hamper 10 upon which is mounted a frame 11 inclined at an angle $\alpha$ of 30 degrees to the track base 9. The frame 11 carries two cylinders 12 each containing a fluid driven ram 13 which is projectable from the cylinder 12 in a rearward direction by a respective energizing means 14 attached to the top hamper 10. The cylinders 12 and 13 are pneumatically operated, the energizing means 14 accordingly comprising a compressed air cylinder. (Fluid coupling not shown).

Also mounted on the top hamper 10 is an electronic control means 15 comprising sensors, analysers and motivators (not shown) for controlling the vehicle drive mechanisms and the ram energizing means 14. The control means 15 may be arranged for remote command or for command by a pre-programmed computer located within the control means 15 so as to make the vehicle autonomous.

The disposition of the various vehicle components relative to the road rollers 6 and 7 is selected to ensure that the vehicle has a centre of gravity 16 which lies as low as possible and as near to the forward roller 6 as is compatible with vehicle stability on level ground. This weight distribution facilitates climbing with the surmounting aid, as will now be described with reference to FIGS. 3 and 4.

FIG. 3 depicts the vehicle 1 encountering an obstacle 30 which is higher than the length of the track base 9. The engagement of the unextended rams 13 with the ground at a point 31 and the low disposition of the centre of gravity 16 of the vehicle has prevented the vehicle from proceeding to a position at which the centre of gravity 16 could over-pass the rearward ground engagement point 31 and thereby cause over turning. As soon as the depicted position has been reached the rams 13 are energized, thereby thrusting the vehicle forward as shown in FIG. 4, to cause the centre of gravity 16 to overpass the crest 32 of the obstacle 30, whereupon the vehicle is rotated about the crest 32 by its own weight, thereafter to continue moving along the top of the obstacle. The tracks are of course rotating throughout this manoeuvre and are able to assist, provided that their speed is roughly matched to the speed of operation of the rams 13. The use of a pneumatic system for the energizing means 14 is to be preferred in this respect to a hydraulic system because of its greater resilience.

The rams 13 may also be advantageously extended to absorb shock on rearwards descent from the obstacle.

Various angles of inclination $\alpha$ of the rams 13 with respect to the track base 9 are permissible within the range 0 to 60 degrees. The variation in thrust angle thus available is pre-selected to suit the type of terrain to be encountered.

The specific embodiment of the invention herein described is an unmanned vehicle suitable for a range of purposes such as decoy, surveillance, supply or sentry duties in hazardous environments.

We claim:

1. A tracked vehicle comprising
   two independently drivable parallel tracks each having a track base;
   a chassis supported on the parallel tracks;
   an obstacle surmounting aid comprised by at least one rearwardly extendable ram slidable in a cylinder mounted above the chassis; and
   a pneumatic energising means for thrusting the ram rearwards of the cylinder when the vehicle is in motion.

2. A vehicle as claimed in claim 1 wherein the cylinder is inclined to the track base in a direction providing convergence at a point rearward of the vehicle of a line projecting longitudinally through the cylinder with a line projected longitudinally along the track base.

3. A vehicle as claimed in claim 2 wherein the said inclination is at an angle within the range 0 to 60 degrees.

4. A vehicle as claimed in claim 3 where the said angle is 30 degrees.

5. A vehicle as claimed in claim 1 wherein the parallel tracks together extend substantially the full width of the chassis so as to cover the belly thereof, and the chassis is located entirely within the periphery of the tracks and carries a top hamper bridging the tracks upon which the cylinder is mounted.

6. A vehicle as claimed in claim 5 wherein the tracks each rotate upon three only direction changing rollers comprising two road rollers defining the track base and a track drive sprocket roller located forwardly of the track base.

7. A vehicle as claimed in claim 6 wherein the two road rollers comprise a forward road roller and a rearward road roller, the center of gravity of the vehicle being located substantially closer to said forward road roller than to said rearward roller.

8. A vehicle as claimed in claim 1 wherein the inner edges of the two tracks lie closely adjacent each other such that the two tracks encompass and cover substantially the full width of the chassis, the chassis being located within the peripheries of the tracks, supports extending from the chassis upwards past the outer edges of the two tracks and supporting a top hamper lying above and bridging the tracks, said cylinder being mounted on said top hamper.

* * * * *